Figure 1:
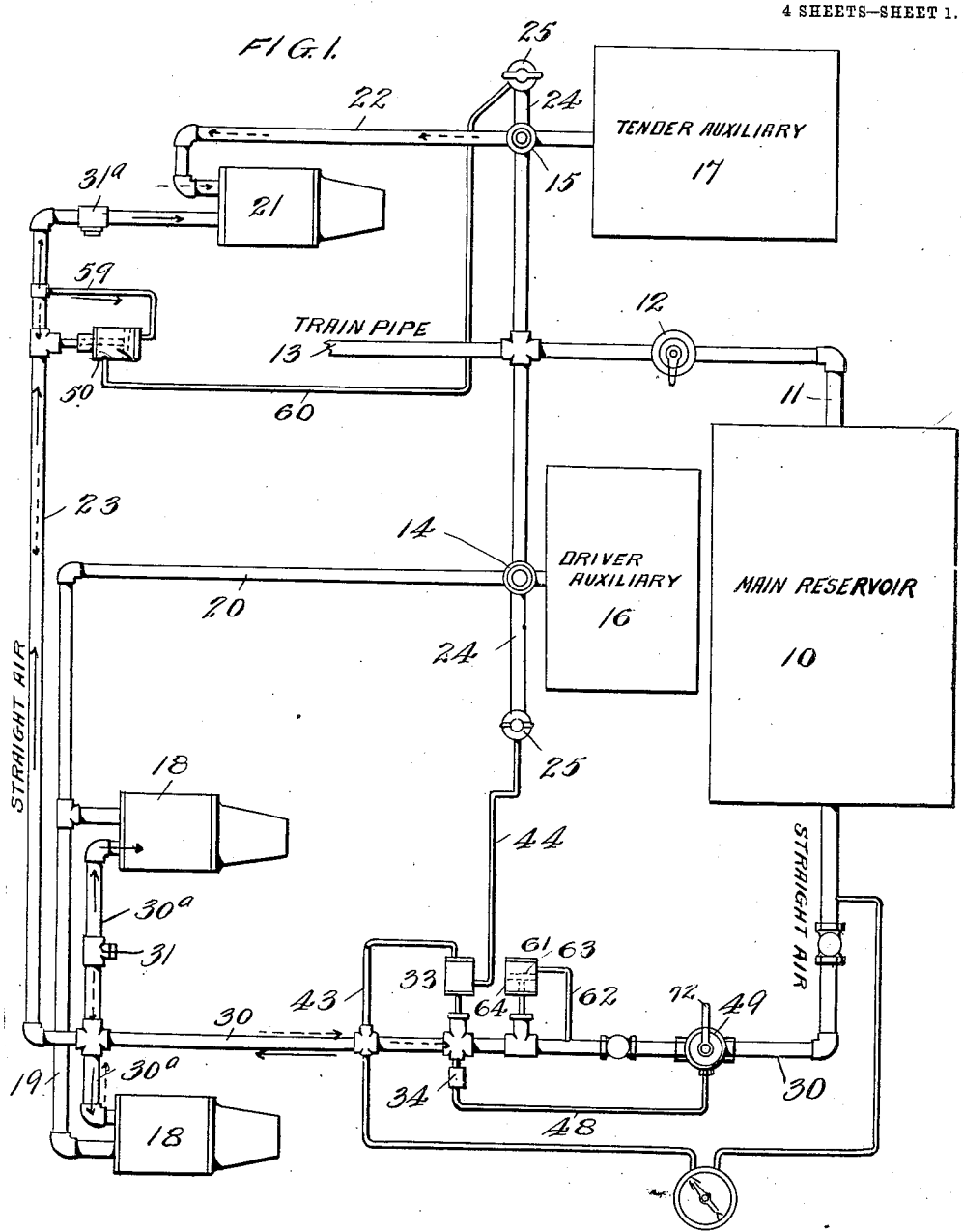

W. R. CHANDLER.
STRAIGHT AIR BRAKE ATTACHMENT FOR AUTOMATIC SYSTEMS.
APPLICATION FILED MAR. 13, 1911.

1,042,083.

Patented Oct. 22, 1912.

4 SHEETS—SHEET 1.

WITNESSES
C. K. Davies
E. A. Jordan

INVENTOR
Willard R. Chandler
By Thomas N. Harner
Attorney

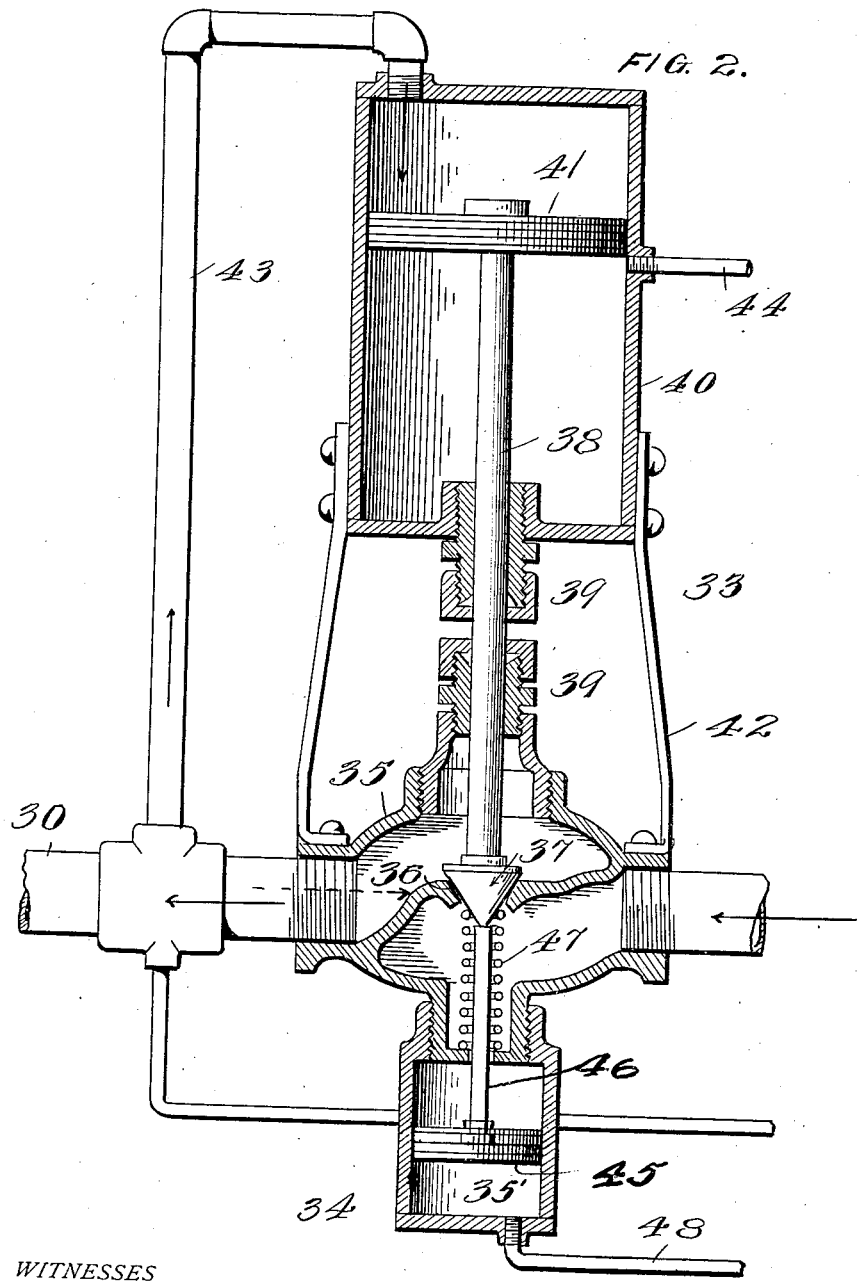

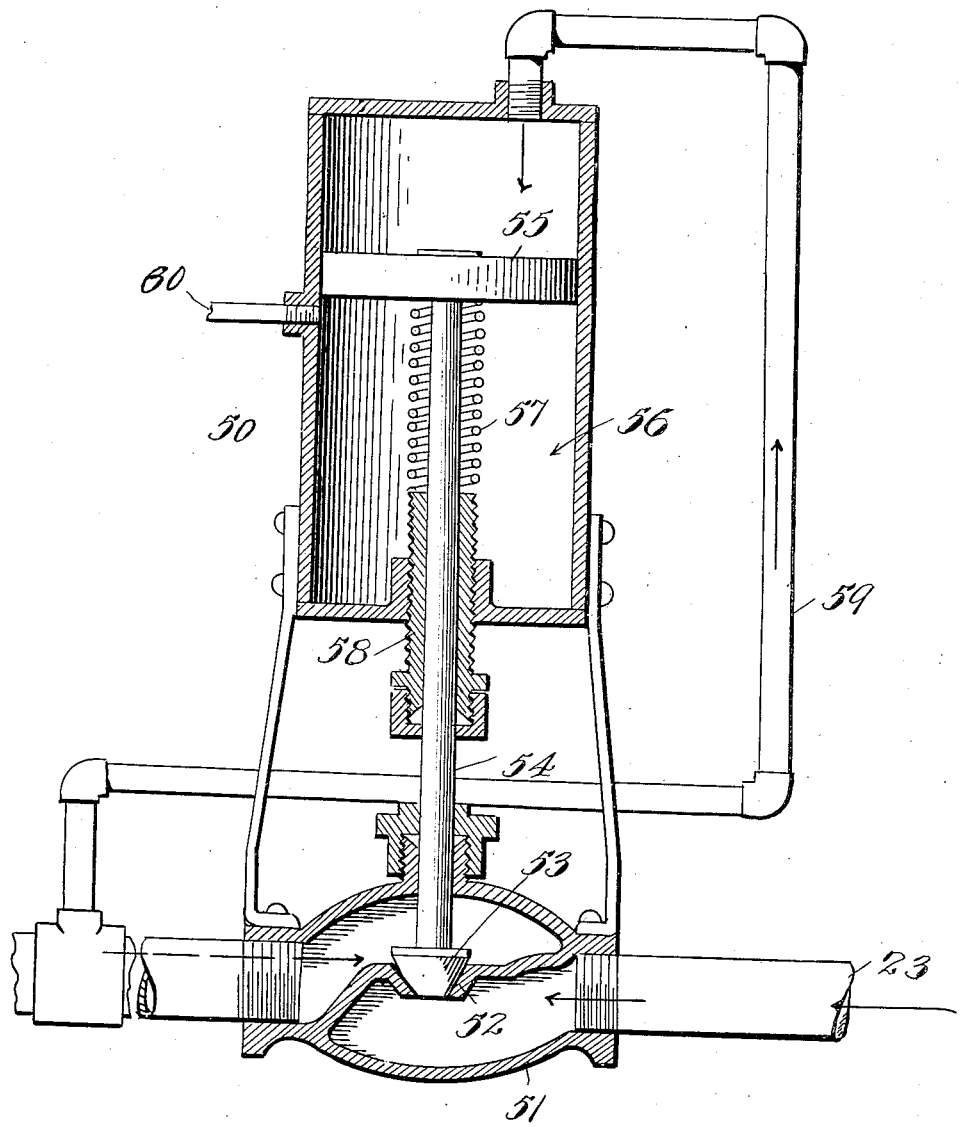

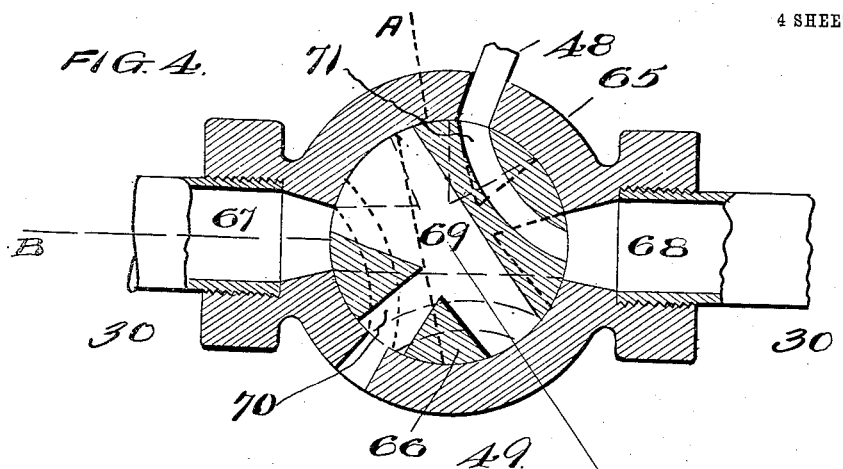
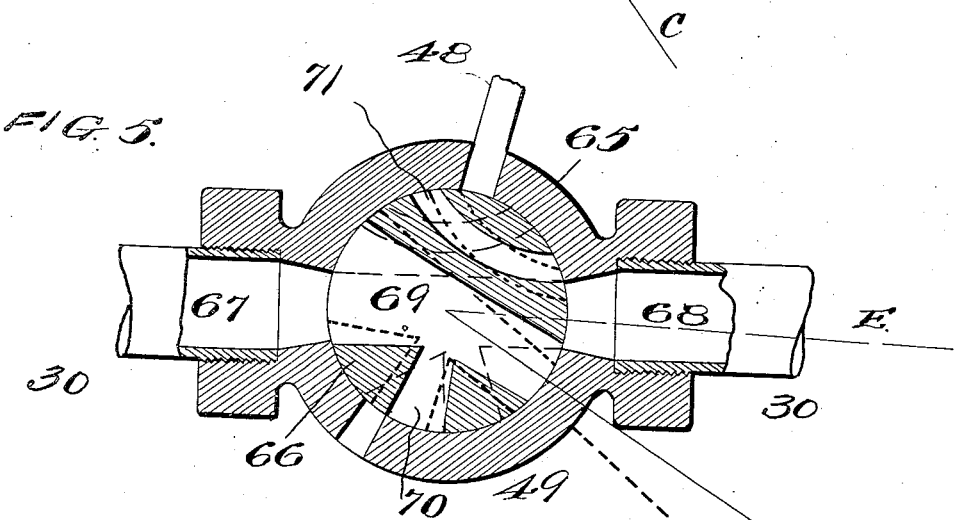
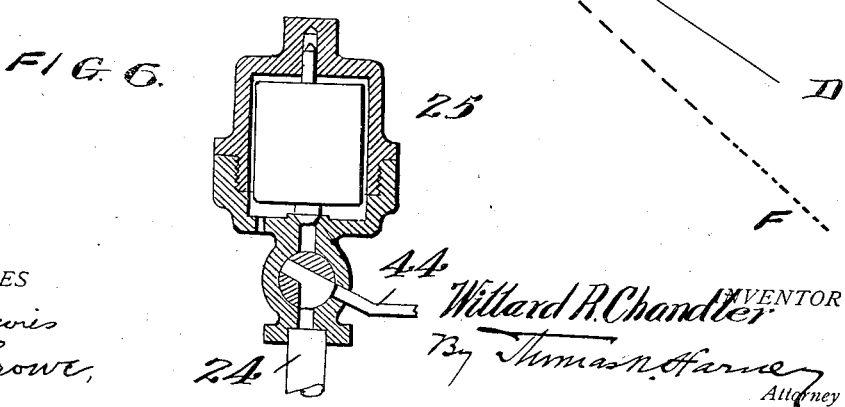

UNITED STATES PATENT OFFICE.

WILLARD R. CHANDLER, OF BRANCHVILLE, SOUTH CAROLINA.

STRAIGHT-AIR BRAKE ATTACHMENT FOR AUTOMATIC SYSTEMS.

1,042,083.    Specification of Letters Patent.    Patented Oct. 22, 1912.

Application filed March 13, 1911. Serial No. 614,170.

*To all whom it may concern:*

Be it known that I, WILLARD R. CHANDLER, a citizen of the United States, residing at Branchville, in the county of Orangeburg and State of South Carolina, have invented certain new and useful Improvements in Straight-Air Brake Attachments for Automatic Systems, of which the following is a specification.

The present invention relates to air brakes and is specially embodied in an improved straight air attachment for automatic brake systems.

The main object of the invention is to provide an equipment which may be attached to standard air systems now in use on trains without decreasing the efficiency and flexibility of the system as a whole, but which will perform its own functions in a highly satisfactory manner.

The invention consists in an equipment comprising a straight air attachment, for standard brake systems, which is applied throughout the train by direct pressure, preferably using a check valve or check valves, which operate automatically to hold the application of the automatic brakes. And the invention further consists in certain novel arrangements of parts, whereby the use of a novel controlling valve permits holding the brakes applied to the train while the brakes on the engine are released, or vice versa; and also allows the release of the application of the automatic brakes, and their re-application with straight air if desirable.

In the accompanying drawings I have illustrated one example of the physical embodiment of my invention constructed according to the best mode I have so far devised for the practical application of the principles, and which has proven highly successful in actual practice.

While I refer hereinafter to the brake cylinders, and application of brakes to the engine and tender only, it will of course be understood that when the cars are equipped with my attachment the same action takes place throughout the train.

Figure 1 is a diagrammatic representation of the novel equipment attached to the usual main reservoir and train pipe. Fig. 2 is a vertical central sectional view of a combined check valve, and release valve, forming part of the system, and in this instance illustrated in connection with the engine driver brakes. Fig. 3 is a vertical sectional view of a valve constituting an element of the straight air application means, illustrated in connection with both the engine and tender brakes. Fig. 4 is a sectional view of the engineer's straight air control valve showing three positions of the valve, and Fig. 5 is a similar view showing the valve in additional and different positions. Fig. 6 is a view illustrating a common form of retainer valve with connections thereto.

Referring to the diagram of Fig. 1 in which is illustrated my equipment as embodied in use on an engine and its tender, the usual elements are illustrated, such as the main reservoir 10; main reservoir pipe 11; engineer's brake valve 12; train pipe 13; driver triple valve 14; tender triple valve 15; driver and tender auxiliary reservoirs 16 and 17 respectively; driver brake cylinders 18, connection 19, and pipe 20 to the triple valve 14; and the tender brake cylinder 21 with its connection 22 to its triple valve 15. In attaching my equipment to the system as thus disclosed, I provide the straight air pipe 23 leading to the oil hole of the brake cylinder 21, from the main straight air pipe 30, which is connected to the main reservoir 10. The exhaust ports of the tender and driver triple valves are closed by short pipes 24, 24, to which are attached the retaining valves 25, 25, for the purpose of retaining air in the brake cylinders when the automatic system is released. The retaining valve 25 is connected by its exhaust port and pipe 44 with check valve 33, and pipe 24 is connected at the bottom of the retaining valve, as usual. The main straight air pipe 30 has branches 30ª, 30ª leading into the oil holes of the driver brake cylinder independent of the automatic connection 19, and said pipe is provided with a safety valve 31, a similar valve 31ª being provided in the pipe 23 which leads into the oil hole of the tender brake cylinder 21.

The driver brake check valve 33 is interposed in the straight air pipe 30. This valve is also in communication with a release valve 34. Referring particularly to Fig. 2, it will be seen that the valve 33, as a whole, comprises the casing 35 formed with a valve seat 36 upon which is adapted to contact the valve head 37 on the stem 38. The usual glands or stuffing boxes 39 are provided through which the stem 38 passes into the cylinder 40, and within this cylinder the piston 41 is located. The cylinder is supported by brackets 42 from the casing 35, and is connected by pipe 43, which enters the cylinder above the piston 41, to the straight-air pipe 30, and a second pipe 44 leads from the cylinder 40 to the retaining valve 25.

In connection with the check valve 33 I also utilize the valve releasing device 34, which embodies a cylinder 35' having the piston 45 working therein, whose stem 46 extends upwardly into the casing 35 and is adapted to contact with the valve head 37 under certain conditions, and an equalizing spring 47 is interposed between the valve head 37 and a portion of casing 35. The valve releasing device 34 is connected, at the lower end of the cylinder 35, by means of the pipe 48 with the straight-air control valve 49.

The tender brake valve 50 (see Fig. 3) is similar in construction to the driver brake valve, comprising the valve casing 51 formed with the seat 52, the valve head 53, and stem 54. A piston 55 is located at the end of the stem 54 and works in the cylinder 56. The movement of the piston may be regulated by means of a spring 57 coiled about the stem 54. This spring is held between the piston and an adjusting nut 58, which is threaded into the bottom of the cylinder 56. A pipe 59 extends from the upper end of the cylinder 56 to the straight-air pipe 23, and a second pipe 60 leads to the retaining valve 25.

For regulating the pressure in the straight-air system, I interpose the valve device 61 in the pipe 30, which has a branch 62 entering above the piston 63 in the cylinder 64. The construction of this valve is exactly similar to that of the valve 50 and needs no further detail description.

The straight air is under the direct influence of the control valve 49 inserted in the pipe 30. As clearly seen in Figs. 4 and 5, this valve comprises the casing 65 in which the valve plug 66 may be rotated, and the casing has the usual inlet 68 and outlet 67 for the pipe 30. The valve plug 66 is formed with a straight diametrical passage 69, the radial port 70, the curved by passage 71 and a handle for operating.

In the drawing I have indicated the flow of fluid pressure, using dotted arrows to indicate the automatic pressure, and full line arrows to indicate the direct pressure.

Referring now particularly to Figs. 4 and 5 wherein six positions, A, B, C, D, E, and F of the valve are indicated.

*Automatic application and release.*—The straight air is cut off from the brake system, and the automatic system is closed to the atmosphere with the valve 49 in position A. Under these conditions the automatic brake may be applied as usual from the engineer's valve 12. When the automatic pressure is applied from valve 12, air enters the brake cylinders 18 and 21 and backs out into pipes 30 and 23 and against the top of the check valve 37 and check valve 53, and pistons 41 and 55, carrying valves 37 and 53 to their seats, thus holding the application of the automatic brakes. When the automatic pressure is released the triple valves free the air that is held in the cylinders and the air is released through the retaining valves 25. The reduced pressure in the brake cylinders weakens the pressure in pipes 43 and 59 and on top of pistons 41 and 55, and the springs 47 and 57, together with pressure of air in pipes 44 and 60, lift the valves 37 and 53 from their seats. Valve 49 is now moved to position F to open pass 70 to the atmosphere. The air now flows through the pipe 30 to valve 49, and by way of by-pass 70 to the atmosphere. The straight air may also have been applied, by means of valve 49, and the valve returned to position A, and there held to keep the brakes applied.

Position B: In this position, the brakes are applied as will be described in position E.

Position C: When the brake valve handle is carried to position C to release the straight air, pressure is admitted to pipe 48 under piston 35'. This pressure being higher than the braking pressure, piston 35 will be lifted, carrying with it the valve 37 and allowing air to pass under the valve back to valve 49 and to the atmosphere.

Position D: In this position the passage 69 is opened sufficiently to permit air to enter the brake cylinders to overcome leaks and hold the brakes applied.

Position E shows the straight air applied to the brakes. Air passes through the valve 49 and pipe 30, enters under the valve seats 52 and 36, lifting the valves 53 and 37, and on to the brake cylinders to apply the brakes. The air in cylinder 40, under piston 41 from valve 25, with the assistance of spring 47, equalizes the pressure, and permits holding the valve 37 unseated. At the same time, air enters cylinder 64 through pipe 62, upon the top of piston 63, compresses spring 57, and carries valve 53 toward its seat, until the proper pressure is obtained, thus regulating the fluid pressure in the system.

It will be understood that only one check valve, as 33, may be used to hold the straight air in both the tender and engine brakes, although I have shown two such valves in the drawings.

While I have referred to my improved air brake system as applied to steam railway trains, it will be understood that my attachment is applicable for use with street railway cars or electric trains using air brakes.

Having thus fully described my invention, what I claim as new and desire to secure by Letters Patent is:—

1. An air brake system comprising a main reservoir, train pipe, brake cylinders, triple valves and brake cylinder connections, a straight air pipe leading from the main reservoir and having branches to the cylinders, release means comprising a cylinder, piston, and a check valve in the straight air pipe, a connection from the cylinder to a triple valve, and a controlling valve to apply the straight air.

2. In an air brake system, a main reservoir and train pipe, connections from said pipe each having a triple valve and a retaining valve connection to the exhaust therefrom, brake cylinders each connected to a triple valve and to each other, a check valve, and an additional connection between the check valve and a retaining valve.

3. The combination in an air brake system of a main reservoir and train pipe, triple valves and retaining valves connected to the exhaust therefrom, brake cylinders connected to the triple valves, independent connections between the brake cylinders, check valves in said connections, and connections from said check valves to said retaining valves.

4. The combination with an air pipe and valve casing of a control valve plug in the casing having a straight passage therethrough, an atmosphere port in the casing and a complementary radial port in the plug, a check valve, a valve releasing device, an outlet pipe from said casing to said device, and a complementary by-passage in the plug.

5. The combination with an air pipe of a pressure regulating device comprising a valve casing and a valve therein, an air chamber and a valve stem provided with a piston, a connection from the air pipe to admit air above the piston, and a connection to admit retained air below said piston, and an equalizing spring below the piston.

In testimony whereof I affix my signature in presence of two witnesses.

WILLARD R. CHANDLER.

Witnesses:
G. W. HILL,
C. L. BRUCE.